United States Patent

[11] 3,603,604

| [72] | Inventor | Peter I. Campbell |
| | | Warwickshire, England |
| [21] | Appl. No. | 846,126 |
| [22] | Filed | July 30, 1969 |
| [45] | Patented | Sept. 7, 1971 |
| [73] | Assignee | C. E. and J. P. Britton Limited |
| | | Birmingham, England |

[54] PIPE FITTING
9 Claims, 3 Drawing Figs.

[52] U.S. Cl. .................................................. 277/209
[51] Int. Cl. ................................................... F16j 15/10
[50] Field of Search .......................................... 277/207,
207 A, 209, 211

[56] References Cited
UNITED STATES PATENTS

| 2,032,492 | 3/1936 | Nathan | 277/207 A |
| 2,896,974 | 7/1959 | Bush | 277/207 A |
| 3,315,970 | 4/1967 | Holloway | 277/207 A |

FOREIGN PATENTS

| 6,407,042 | 12/1965 | Netherlands | 277/207 A |
| 1,432,209 | 2/1966 | France | 277/207 A |

*Primary Examiner*—Robert I. Smith
*Attorney*—Scrivener, Parker, Scrivener and Clarke ABSTRACT: A seal between a pipe and a socket in which one end of the pipe is adapted to be received is formed by at least one annular membrane or diaphragm carried by the ring and relative to which the pipe is slidable axially when the pipe and socket are slidably engaged.

PATENTED SEP 7 1971

3,603,604

PIPE FITTING

SPECIFIC DESCRIPTION

This invention relates to an improved pipe fitting and a new or improved joint to provide a fluidtight connection between a pipe and a socket in which an end of the pipe is received. For example the joint may be a down pipe and an S-bend connection in the waste pipe of a domestic wash basin.

According to our invention a seal between a pipe and a socket in which one end of the pipe is adapted to be received is formed by at least one resilient annular membrane or diaphragm carried by a ring adapted to be retained within the socket and relative to which the pipe is slidable axially when the pipe and socket are slidably engaged, the arrangement being such that when the pipe is inserted into the socket the membrane or diaphragm is rolled or hinged back on itself in a trailing direction relative to the direction of movement of the pipe with respect to the socket whereby the face of the membrane or diaphragm which is then remote from the ring is adapted to engage with the pipe to provide a fluidtight seal between the ring and the pipe.

Preferably the ring is formed from a plastics material and the membrane or diaphragm comprises an annular flange of reduced thickness which in a free and unstressed condition normally extends in a direction substantially at right angles to the adjacent surface of the ring with which it is integral.

One embodiment of our invention is illustrated in the accompanying drawing in which:

FIG. j is an end elevation of a sealing ring provided with a pair of axially spaced oppositely extending radial flanges;

Figure 1:
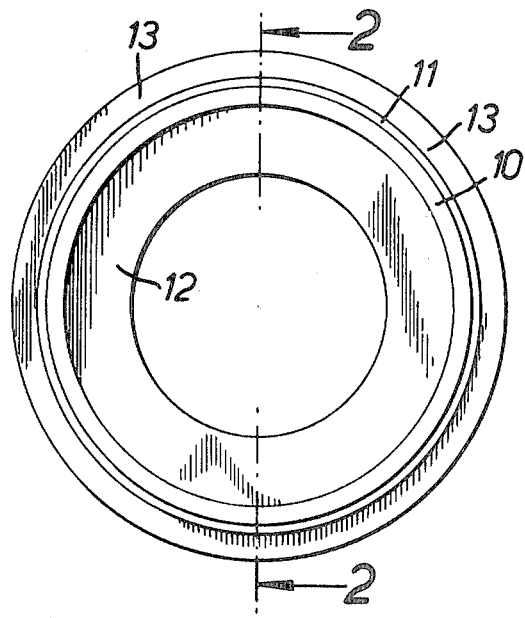
Figure 2:
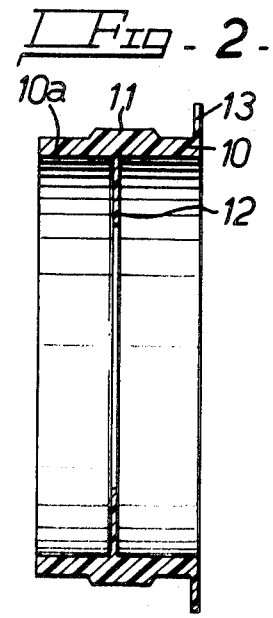
FIG. 2 is a section on the line 2—2 of FIG. 1.

The sealing ring illustrated in FIGS. 1 and 2 of the drawings is constructed from a resilient plastics material, for example, polypropylene, and comprises a sleeve 10 having an integral continuous radial rib 11 extending outwardly at an intermediate point in the axial length of the sleeve.

At an intermediate point in its axial length the sleeve 10 is provided with a continuous integral inwardly extending annular flange 12, and at one end the sleeve is provided with a continuous integral outwardly extending annular flange 13. In a free and unstressed condition the flanges 12 and 13 extend in a direction substantially at right angles to the main longitudinal axis of the sleeve 10, and the flange is of a greater radial length than the flange 12. The flanges 12 and 13 are relatively thin when compared with the wall thickness of the sleeve 10 and each comprises a membrane or diaphragm which is adapted to be rolled or hinged back on itself to form respectively, a seal between the sleeve 10 and a complementary part adapted to be inserted into the sleeve 10, and between the sleeve and a cooperating part into which the sleeve is adapted to be inserted.

Figure 3:
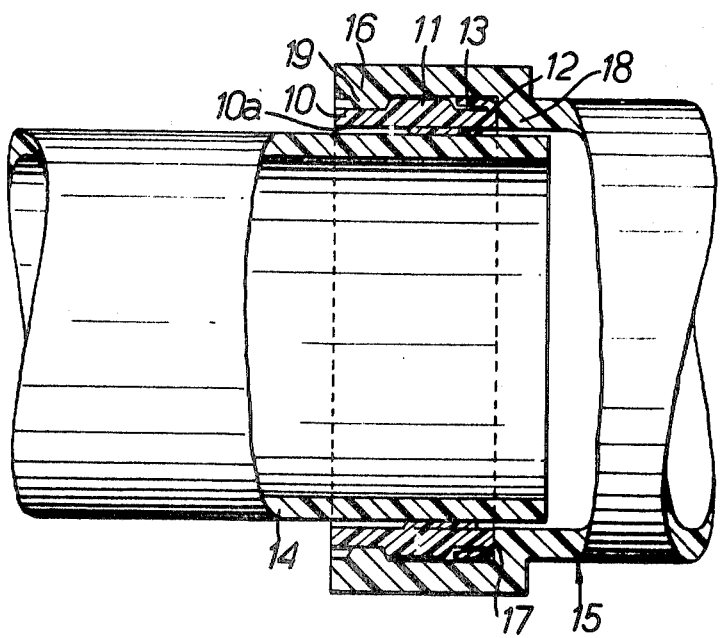
FIG. 3 is a longitudinal section through a pipe and socket assembly in which the sealing ring illustrated in FIGS. 1 and 2 is retained within the socket.

As illustrated in FIG. 3, the sealing ring is adapted to form a seal between a pipe 14 and a socket 15. The socket 15 comprises a limb of an elbow of which only a part is illustrated, and into which one end of the pipe 14 is adapted to be inserted. The socket 15 is formed from a resilient plastics material, suitably polypropylene, and has an open-ended cylindrical outer end portion 16 of an internal diameter substantially greater than the internal diameter of the pipe 14 and equal to or slightly greater than the external diameter of the rib 11 of the sleeve 10. The outer end portion 16 of the socket extends inwardly for a predetermined axial distance terminating at its inner end in a shoulder 17 at a step in diameter between the inner end of the portion 16 and the outer end of a portion 18 of an internal diameter greater than the external diameter of the pipe 14.

At an intermediate point in its axial length, the end portion 16 is provided with an inwardly extending continuous radial rib 19 of a diameter substantially equal to the external diameter of the sleeve 10.

The sealing ring is inserted into the portion 16 of the socket 15 with the flange 13 innermost until the then innermost end of the sleeve 10 engages with the shoulder 17. When inserting the ring into the socket 15, the material of the socket 15 expands resiliently to permit the rib 11 to pass over the rib 19 to provide a detachable push-in and snap engagement. During this movement the flange 13 engages with the outer end of the wall of the portion 16 and rolls or hinges back on itself in a trailing direction and the inherent resilience of the material of the flange 13 acts to hold the flange 13 firmly in engagement with the interior cylindrical surface of the portion 16 to form a seal against the portion 16.

The axial position of the rib 19 in the socket is chosen so that the innermost end face of the rib 19 engages with the outermost end face of the rib 11 of the sealing ring to retain the ring in position with its innermost end in abutment with the shoulder 17.

As illustrated the end faces of the ribs 11 and 19 are oppositely inclined or chamfered to facilitate the push-in and snap engagement described above.

When an end of the pipe 14 is inserted into the open end of the sealing ring within the socket 15, through the sleeve 10 and into the portion 18 of reduced diameter, the engagement between that end of the pipe 14 and the flange 12 causes the flange 12 to roll or hinge back on itself and the inherent resilience of the material of the flange 12 holds the flange firmly in engagement with the pipe over a substantial area to form a fluidtight seal.

The movement of the pipe 14 into the socket is limited by the provision of stop means (not shown) in the portion 18 with which the inner end of the pipe is adapted to engage in the fully inserted position.

Preferably the interior surface of the portion of the sleeve 10a outwardly of the flange 12 is tapered in a direction towards the end of the sleeve remote from the flange 13 to form a gradual lead in for the end of the pipe 14.

In use, when the assembly illustrated in FIG. 3 is installed in a system with the socket 15 above the pipe 14, liquid flowing in the pipe will be prevented from escaping from between the pipe 14 and the sleeve 10 by the engagement of the flange 12 with the pipe. Any tendency for liquid to flow between the flange 12 and the sleeve 10 acts to enhance the sealing effect between the flange 12 and the pipe 14.

Any liquid tending to pass between the innermost end of the sleeve 10 and the shoulder 17 is prevented from escaping by the engagement between the sleeve 13 and the interior surface of the portion 16 of the socket, and the engagement between cooperating end faces of the complementary ribs 11 and 19.

When the assembly is installed in an inverse position, with the pipe 14 above the socket 15, there will be no tendency for liquid to pass between the pipe 14 and the sealing ring.

Our invention is particularly suitable for any low pressure systems and has the advantage that it is simple to manufacture and assemble.

Although in the embodiment described above at least the flange 12 forming the membrane or diaphragm seal against the pipe 14 is positioned substantially at right angles to the main longitudinal axis of the sleeve, in a modification this membrane or diaphragm 12 may be located in a plane inclined with respect to a plane normal to the main longitudinal axis of the sleeve 10 to facilitate the insertion of the pipe 14 past the flange 12, since the flange 12 is then deformed progressively as the pipe 14 is inserted through it.

In a modification each membrane or diaphragm 12, 13 may be formed in the surface which seals against the pipe 14 or the portion 16 of the socket 15 respectively with a plurality of continuous annular grooves of which the ribs between pairs of grooves form separate seals with the surfaces against which the membrane or diaphragm engages.

In a further modification, more the sleeve 10 may be provided with two or more inwardly and outwardly extending axially spaced flanges adapted to roll or hinge back on themselves to make seals respectively with the pipe and with the internal wall of a socket into which the pipe is adapted to be inserted.

In another embodiment the rib 11 may be extended radially and have a push-in and snap engagement in an annular groove in the wall of the portion 16 of the socket. Alternatively the rib 19 in the socket may have a push-in and snap engagement in a complementary annular groove in the sleeve 10.

In a further modified construction the sleeve 10 may have a screw-threaded engagement in the portion 16 which is screw threaded internally.

I claim:

1. A synthetic plastics pipe-coupling socket having a main portion, and end portion integral with said main portion, said end portion being of an internal diameter greater than that of said main portion and having a free outer end, a shoulder at a step in diameter between said main portion and said end portion, and a single integral rib projecting inwardly of said end portion and spaced axially from said shoulder, in combination with a one-piece cylindrical synthetic plastics sleeve housed within said end portion and having an inner end face for sealing engagement with said shoulder and an outer end face, said sleeve having an external diameter substantially equal to said internal diameter of said end portion and an internal diameter substantially equal to said internal diameter of said main portion, abutment means on said sleeve spaced axially from said inner end face, an engagement between said rib and said abutment means to retain said sleeve within said end portion against axial movement relative to said socket and with said inner end face in sealing engagement with said shoulder, and a relatively thin resilient inwardly directed annular flange wholly integral with said sleeve and so constructed and arranged that when a pipe end of an external diameter less than said internal diameter of said main portion of said socket is inserted into said end portion of said socket said pipe end engages with said annular flange to cause said annular flange to roll and hinge back on itself and form a fluidtight seal with the pipe end.

2. Means as claimed in claim 1, wherein said annular flange in a free and unstressed condition extends in a direction substantially at right angles to the adjacent surface of said sleeve with which it is integral.

3. Means as claimed in claim 1, wherein said annular flange is located at an intermediate point in the axial length of said ring.

4. Means as claimed in claim 1, wherein said sleeve is provided with at least one relatively thin outwardly extending integral flange forming a second diaphragm adapted to roll or hinge back on itself in a trailing direction when said sleeve is inserted into an open outer end of said socket to provide a fluidtight seal between said sleeve and said socket, said second flange being located at a position in the length of the sleeve spaced from the end of said sleeve which is outermost when said sleeve is inserted into said socket by a distance at least equal to the radial length of said second flange.

5. Means as claimed in claim 4, wherein said second flange is located at the end of said sleeve which is innermost when said sleeve is inserted into said socket.

6. A socket as claimed in claim 1, wherein said abutment means comprises a single continuous outwardly extending rib integral with said sleeve for detachable engagement with said rib in said socket.

7. A socket as claimed in claim 6, wherein said rib integral with said sleeve is received within an annular groove of substantial axial length in said end portion, said annular groove being defined between said single integral rib projecting inwardly of said end portion and said shoulder.

8. A socket as claimed in claim 1, wherein said sleeve is of an axial length substantially equal to the axial length of said end portion between said free outer end and said shoulder, and said outer end face of said sleeve is substantially aligned with said free outer end of said end portion.

9. A socket as claimed in claim 1, wherein said socket is constructed from a resilient plastics material, and said one-piece sleeve is retained in said end portion by a push-in and snap engagement between said abutment means and said rib.